UNITED STATES PATENT OFFICE.

WALTER LANGDON-DAVIES AND ALFRED SOAMES, OF SURREY, ENGLAND.

DYNAMO-ELECTRIC MACHINE.

SPECIFICATION forming part of Letters Patent No. 686,856, dated November 19, 1901.

Application filed June 14, 1901. Serial No. 64,546. (No model.)

*To all whom it may concern:*

Be it known that we, WALTER LANGDON-DAVIES and ALFRED SOAMES, electricians, subjects of the King of Great Britain, residing at 101 Southwark street, in the county of Surrey, England, have invented certain new and useful Improvements in Dynamo-Electric Machines, of which the following is a specification.

For many purposes it is required that dynamo-electric machines, especially when used as motors, should be absolutely inclosed within an outer casing and shut off from the surrounding air. In such cases it is difficult to keep the armatures sufficiently cool, and when they become heated the motor loses in efficiency. To cool and ventilate the armatures in such cases and wherever it is desired that the air or fluid used for cooling shall be shut off from the outer body and commutator, we form on each side of the armature-core a closed air-chamber, and the two chambers we connect with one another by passages formed through this core. To one chamber we supply a stream of air or other fluid through a passage formed through one end of the spindle and allow it to pass away from the other chamber through a passage formed through the other end of the spindle. The armature-windings are inside the casings.

Figure 1:
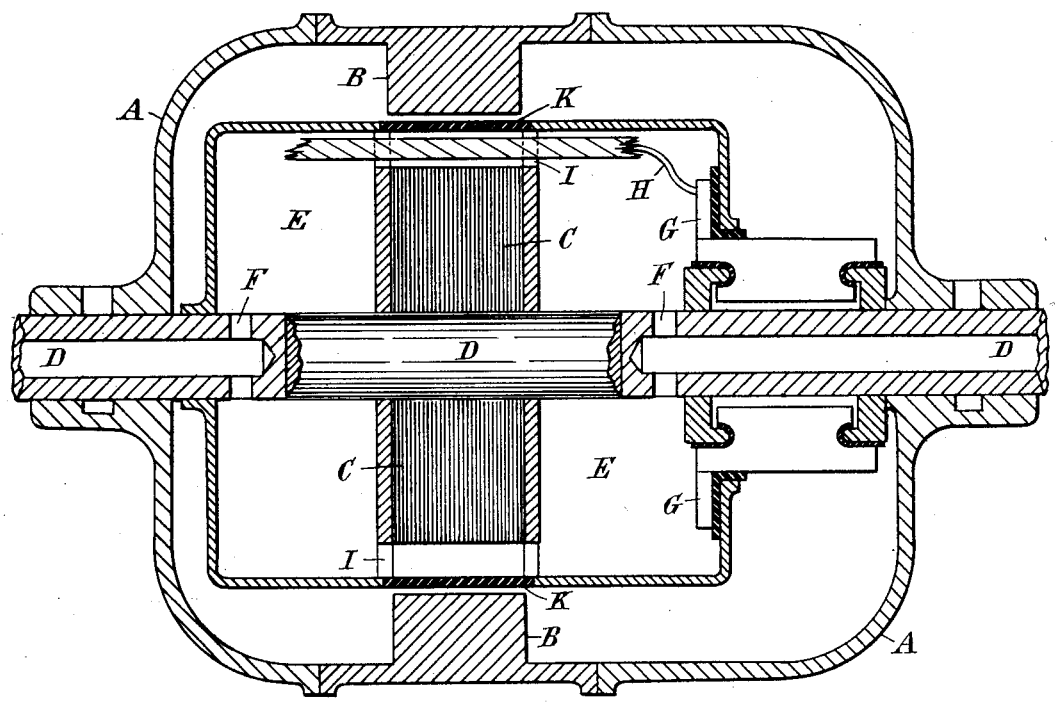
Figure 2:
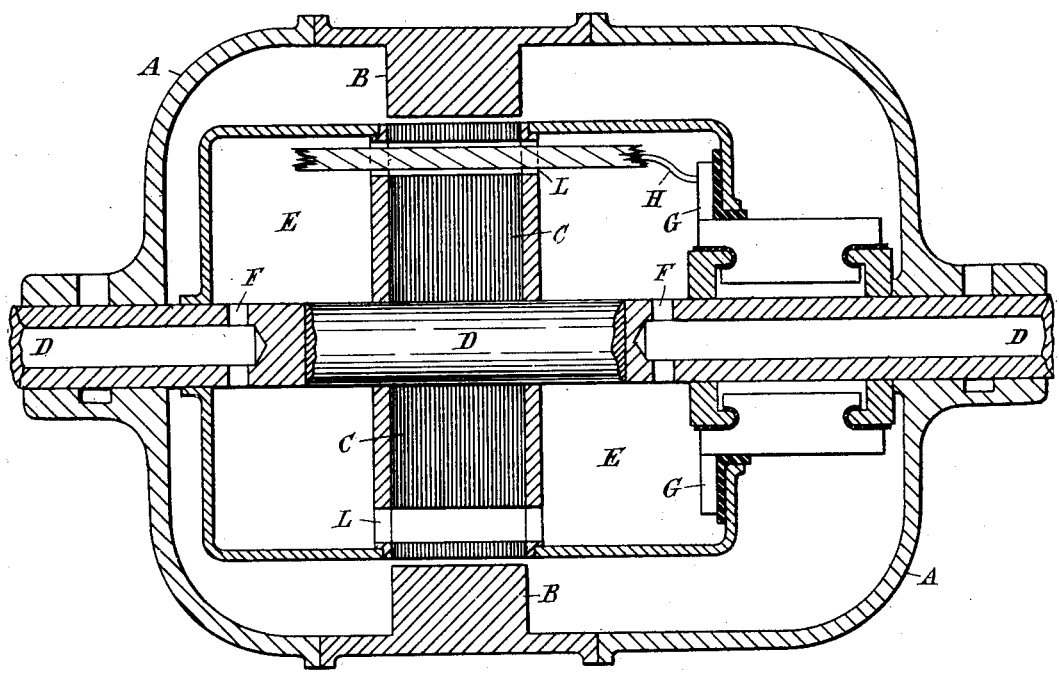

In the drawings, Figures 1 and 2 are longitudinal sections of dynamo-electric machines embodying our improvements.

A is an outer casing.

B B are field-magnet pole-pieces. The field-windings are not shown.

C is an armature-core of laminated iron fixed on an armature-axis D.

E E are air or fluid chambers, one on either side of the armature-core.

F F are passages formed through the two ends of the axis D, through which air or fluid can pass to or away from the chambers E.

G G are bars of a commutator.

H is one end of one of the armature-windings, shown coupled to one of the commutator-bars.

In Fig. 1 the windings lie in grooves I, formed across the outer periphery of the armature-core and are inside the chambers, and the air or fluid passing from one chamber to the other passes through the same grooves.

K is a ring of non-conducting material which shuts off all communication between the grooves I and the interior of the outer casing A.

In Fig. 2 the construction is the same, except that the thin iron disks of which the armature-core is composed extend to within a short distance of the field-magnet poles and the windings are carried through holes L, formed through the disks.

Any suitable means may be adopted for supplying a continuous stream of air or fluid to one or other end of the armature-spindle.

By cooling the armature-core or armature core and windings in the above way the whole interior of the outer casing containing the field-magnet windings and commutator is also kept cool, as heat is carried off from it by conduction through the metal of which the chambers E are composed.

What we claim is—

The combination of an electric motor, a casing within which it is inclosed, bearings at each end of the casing through which the axis of the motor's armature extends, another casing inclosing the windings of the armature as well as its core, the armature-core dividing this casing into two compartments one at each of its ends, passages formed transversely through the armature-core, the armature-windings extending through and only partly filling these passages so that space is left for air or fluid in one compartment to pass to the other, a passage formed through one end of the axis by which air or fluid can be supplied to one compartment and a passage formed through the other end of the axis by which it can escape from the other compartment.

WALTER LANGDON-DAVIES.
ALFRED SOAMES.

Witnesses:
R. B. RANSFORD,
J. H. WHITEHEAD.